US012573406B2

(12) United States Patent
Martin et al.

(10) Patent No.: US 12,573,406 B2
(45) Date of Patent: Mar. 10, 2026

(54) VOICE AUTHENTICATION BASED ON ACOUSTIC AND LINGUISTIC MACHINE LEARNING MODELS

(71) Applicant: Cisco Technology, Inc., San Jose, CA (US)

(72) Inventors: Stéphane B. Martin, Lausanne (CH); Erwan Barry Tarik Zerhouni, Zürich (CH)

(73) Assignee: CISCO TECHNOLOGY, INC., San Jose, CA (US)

( * ) Notice: Subject to any disclaimer, the term of this patent is extended or adjusted under 35 U.S.C. 154(b) by 310 days.

(21) Appl. No.: 17/977,443

(22) Filed: Oct. 31, 2022

(65) Prior Publication Data

US 2024/0144935 A1 May 2, 2024

(51) Int. Cl.
| | |
|---|---|
| *G10L 17/14* | (2013.01) |
| *G06F 40/30* | (2020.01) |
| *G10L 17/02* | (2013.01) |
| *G10L 17/04* | (2013.01) |
| *G10L 17/10* | (2013.01) |
| *G10L 17/18* | (2013.01) |

(52) U.S. Cl.
CPC .............. *G10L 17/14* (2013.01); *G06F 40/30* (2020.01); *G10L 17/02* (2013.01); *G10L 17/04* (2013.01); *G10L 17/10* (2013.01); *G10L 17/18* (2013.01)

(58) Field of Classification Search
CPC ......... G10L 17/14; G10L 17/02; G10L 17/04; G10L 17/10; G10L 17/18; G06F 40/30
See application file for complete search history.

(56) References Cited

U.S. PATENT DOCUMENTS

| | | | | |
|---|---|---|---|---|
| 9,686,275 | B2 * | 6/2017 | Chari | ................. H04L 63/0861 |
| 10,027,662 | B1 * | 7/2018 | Mutagi | .............. H04L 63/0861 |
| 10,277,590 | B2 * | 4/2019 | Chari | ..................... G10L 17/02 |
| 10,910,105 | B2 * | 2/2021 | McCloskey | .......... A61B 5/0022 |
| 10,957,318 | B2 * | 3/2021 | Mishra | ............... G06F 16/3344 |
| 11,238,845 | B2 * | 2/2022 | Chen | ..................... G10L 15/005 |
| 11,551,699 | B2 * | 1/2023 | Huh | ....................... G10L 17/06 |
| 11,587,569 | B2 * | 2/2023 | Ye | .......................... G10L 15/16 |

(Continued)

FOREIGN PATENT DOCUMENTS

| | | |
|---|---|---|
| WO | 2021216299 A1 | 10/2021 |
| WO | 2022065879 A1 | 3/2022 |

OTHER PUBLICATIONS

Cai, Danwei, Zexin Cai, and Ming Li, "Identifying Source Speakers for Voice Conversion based Spoofing Attacks on Speaker Verification Systems", Jun. 2022, arXiv preprint arXiv:2206.09103. (Year: 2022).*

(Continued)

*Primary Examiner* — Daniel C Washburn
*Assistant Examiner* — James Boggs
(74) *Attorney, Agent, or Firm* — Edell, Shapiro & Finnan, LLC

(57) ABSTRACT

In one example embodiment, acoustic characteristics of a user voice are analyzed by a first machine learning model of a processor. Linguistic patterns in the user voice are analyzed by a second machine learning model of the processor. The user is authenticated with respect to an authorized user by the processor based on analysis of the acoustic characteristics and the linguistic patterns of the user voice by the first and second machine learning models.

20 Claims, 6 Drawing Sheets

(56) References Cited

U.S. PATENT DOCUMENTS

| | | | | |
|---|---|---|---|---|
| 11,823,684 | B2 * | 11/2023 | Sharifi | G10L 17/06 |
| 11,869,511 | B2 * | 1/2024 | Siyavudeen | G10L 15/01 |
| 11,929,078 | B2 * | 3/2024 | Tuo | G10L 17/18 |
| 11,942,094 | B2 * | 3/2024 | Chojnacka | G06F 21/32 |
| 12,015,637 | B2 * | 6/2024 | Lakhdhar | H04L 65/1079 |
| 12,093,827 | B2 * | 9/2024 | Kursun | G06F 18/214 |
| 2008/0059176 | A1 | 3/2008 | Ravi et al. | |
| 2018/0146370 | A1 * | 5/2018 | Krishnaswamy | G10L 19/018 |
| 2020/0118544 | A1 | 4/2020 | Lee et al. | |
| 2021/0174813 | A1 | 6/2021 | Huh et al. | |
| 2021/0326421 | A1 * | 10/2021 | Khoury | G10L 17/08 |
| 2022/0004904 | A1 * | 1/2022 | Stemmer | G06F 18/2148 |
| 2022/0059121 | A1 * | 2/2022 | Rao | G10L 25/60 |
| 2022/0121868 | A1 * | 4/2022 | Chen | G06V 20/49 |
| 2024/0127825 | A1 * | 4/2024 | Carroll | G10L 17/14 |

OTHER PUBLICATIONS

Laptev, Aleksandr, Roman Korostik, Aleksey Svischev, Andrei Andrusenko, Ivan Medennikov, and Sergey Rybin, "You Do Not Need More Data: Improving End-to-End Speech Recognition by Text-to-Speech Data Augmentation", Oct. 2020, 13th International Congress on Image and Signal Processing, pp. 439-444. (Year: 2020).*

Zhao, Yuanjun, Roberto Togneri, and Victor Sreeram, "Replay anti-spoofing countermeasure based on data augmentation with post selection", May 2020, Computer Speech and Language, vol. 64, No. 101115, pp. 1-19. (Year: 2020).*

Ceaparu, Marian, Stefan-Adrian Toma, Svetlana Segarceanu, George Suciu, and Inge Gavat, "Multifactor Voice-Based Authentication System", Feb. 2020, Journal of Engineering Science and Technology Review, Special Issue on Telecommunications, Informatics, Energy and Management, pp. 131-136. (Year: 2020).*

Safavi, Saeid, Hock Gan, Iosif Mporas, and Reza Sotudeh, "Fraud Detection in Voice-based Identity Authentication Applications and Services", Dec. 2016, 2016 IEEE 16th International Conference on Data Mining Workshops (ICDMW), pp. 1074-1081. (Year: 2016).*

Bhattacharya, G. et al., "Generative Adversarial Speaker Embedding Networks for Domain Robust End-To-End Speaker Verification," McGill University, Computer Research Institute of Montreal, https://arxiv.org/pdf/1811.03063.pdf, Nov. 7, 2018, 5 pages.

Sriram, A. et al., "Robust Speech Recognition Using Generative Adversarial Networks," Baidu Research, Sunnyvale, CA, USA, https://arxiv.org/pdf/1711.01567.pdf, Nov. 5, 2017, 5 pages.

Khanjani, Z. et al., "How Deep Are the Fakes? Focusing on Audio Deepfake: A Survey," University of Maryland Baltimore County, Information System department, USA, https://arxiv.org/pdf/2111.14203.pdf, Nov. 28, 2021, 27 pages.

Xu, W. et al., "DRB-GAN: A Dynamic ResBlock Generative Adversarial Network for Artistic Style Transfer," https://arxiv.org/pdf/2108.07379.pdf, Oct. 2, 2021, 20 pages.

Azure Cognitive Services | Microsoft Learn, "What is speaker recognition?," https://learn.microsoft.com/en-us/azure/cognitive-services/speech-service/speaker-recognition-overview, Aug. 25, 2022, 4 pages.

Text Similarity API | Twinword, "How to Use APIs," Evaluate the similarity of two words, sentences, or paragraphs., https://www.twinword.com/api/text-similarity.php, retrieved Oct. 31, 2022, 5 pages.

PyTorch, "From Research to Production," 1.13 Core blog: PyTorch 1.13 release, including beta versions of functorch and improved support for Apple's new M1 chips., https://pytorch.org/, retrieved Oct. 31, 2022, 3 pages.

* cited by examiner

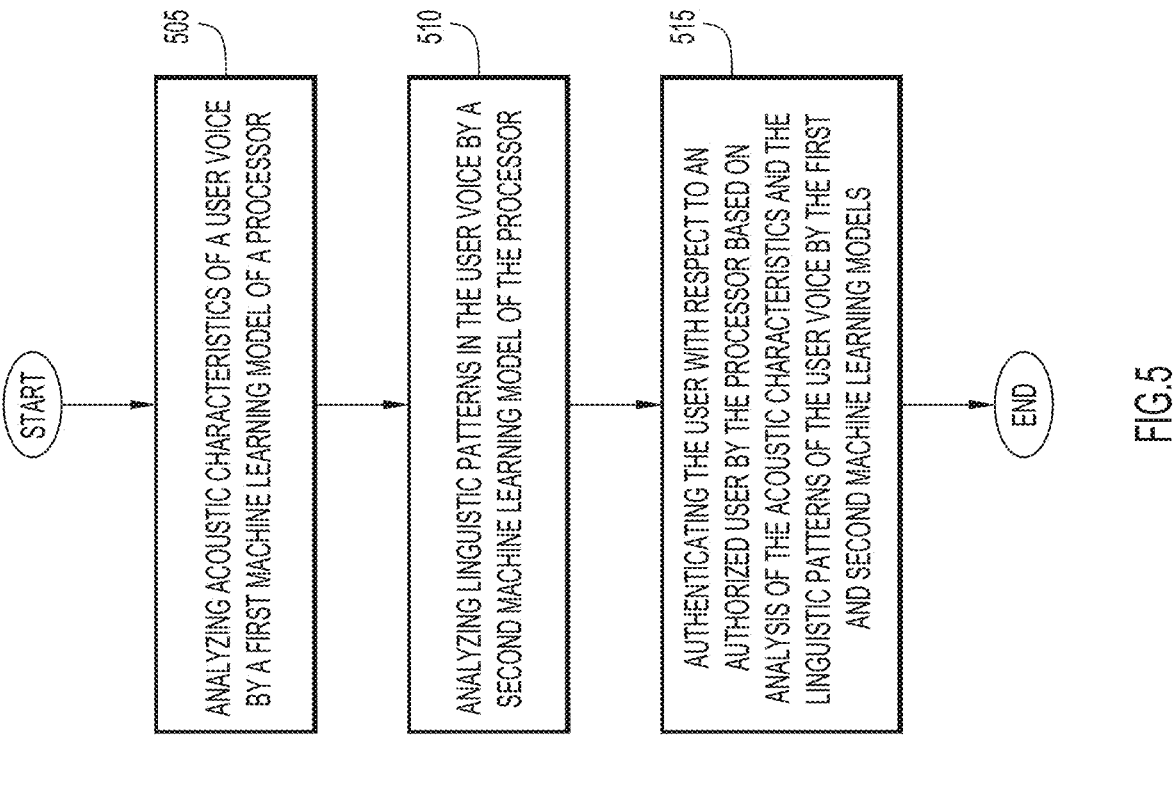

START

505

ANALYZING ACOUSTIC CHARACTERISTICS OF A USER VOICE BY A FIRST MACHINE LEARNING MODEL OF A PROCESSOR

510

ANALYZING LINGUISTIC PATTERNS IN THE USER VOICE BY A SECOND MACHINE LEARNING MODEL OF THE PROCESSOR

515

AUTHENTICATING THE USER WITH RESPECT TO AN AUTHORIZED USER BY THE PROCESSOR BASED ON ANALYSIS OF THE ACOUSTIC CHARACTERISTICS AND THE LINGUISTIC PATTERNS OF THE USER VOICE BY THE FIRST AND SECOND MACHINE LEARNING MODELS

END

VOICE AUTHENTICATION BASED ON ACOUSTIC AND LINGUISTIC MACHINE LEARNING MODELS

TECHNICAL FIELD

The present disclosure relates to voice and speech processing.

BACKGROUND

Among various malicious activities that can be directed toward an organization, a common malicious activity is for a malicious person to impersonate a member of the organization and request some action from an unsuspecting member. The requested action for the unsuspecting member may be providing a password or some sensitive information, or creating a vulnerability. The malicious activity is typically accomplished through a telephone call or a similar medium. Since the unsuspecting member believes the request is provided from a legitimate source, the unsuspecting member participates in the malicious activity in good faith, thereby exposing the unsuspecting member and organization to harm.

BRIEF DESCRIPTION OF THE DRAWINGS

FIG. 5 illustrates a flowchart of a generalized method for authenticating a user based on voice signals, according to an example embodiment.

DETAILED DESCRIPTION

Overview

In one example embodiment, acoustic characteristics of a user voice are analyzed by a first machine learning model of a processor. Linguistic patterns in the user voice are analyzed by a second machine learning model of the processor. The user is authenticated with respect to an authorized user by the processor based on analysis of the acoustic characteristics and the linguistic patterns of the user voice by the first and second machine learning models.

EXAMPLE EMBODIMENTS

The occurrence of voice impersonations to conduct malicious activities has been increasing at an alarming rate. Accordingly, an example embodiment relies on a combination of acoustic or audio features and linguistic traits or patterns that are unique to a user (or speaker) in order to authenticate the user (or detect a voice impersonation). The example embodiment employs machine learning (ML) techniques capable of detecting the voice impersonation.

An example embodiment prevents malicious activities using voice impersonation based on social engineering by training machine learning (ML) models including an acoustic model and a grammatical-linguistic model. These machine learning (ML) models analyze various aspects of audio message impersonation or spoofing (acoustic and linguistic aspects), and predictions determined by these models are combined to produce a probability score that assesses authenticity. Once the machine learning (ML) models are trained with data from an organization, audio signals of voice received from an alleged member is provided for analysis, and a score is returned indicating a likelihood that the alleged member is genuine or authorized. When the likelihood is sufficiently low, an alarm can be raised to inform the organization to provide an appropriate response.

It will be appreciated that present embodiments may authenticate voice signals for any scenarios or activities involving voice (e.g., telephone or other calls, communications, audio messages, speech and/or voice recognition systems, voice responsive systems for performing actions, online or other meetings or communication sessions, etc.).

Figure 1:
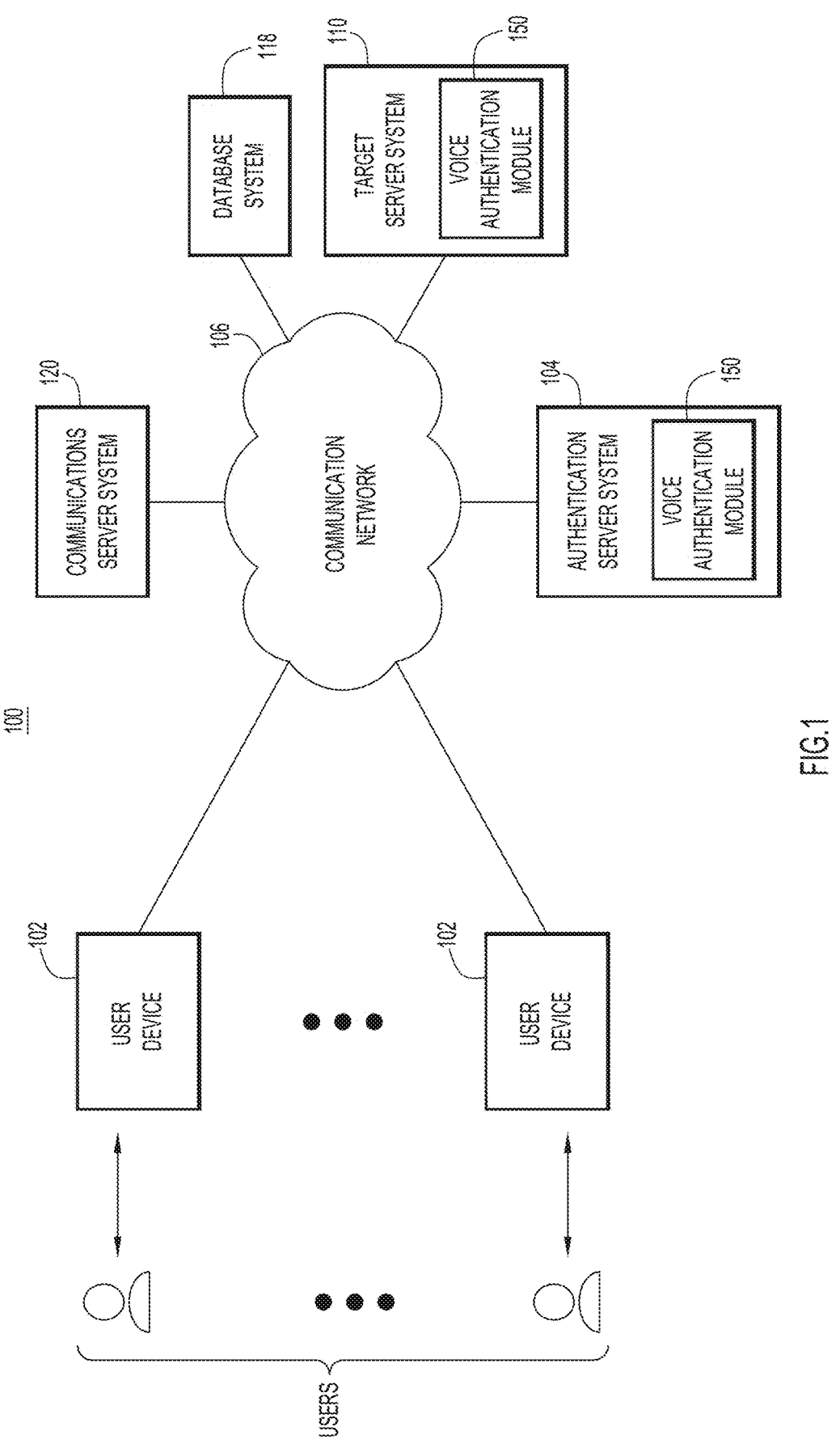
FIG. 1 is a block diagram of an example computing environment in which authentication of users based on voice signals may be implemented, according to an example embodiment.

FIG. 1 illustrates a block diagram of an example computing environment 100 in which an embodiment presented herein may be implemented. Environment 100 includes multiple user devices 102 (collectively referred to as user, participant devices, or platforms) operated by local users/participants, an authentication server system 104 configured to authenticate users based on voice signals, a target server system 110 configured to provide functionality based on a voice call or message, a communications server system 120 configured to support communication sessions between the user devices and/or between the user devices and a desired target destination device (e.g., web-based or over-a-network collaborative meetings, calls, conversations or chats, etc.), a database system 118 to store information for voice authentication, and a communication network 106 communicatively coupled to the user devices, database system, and the authentication, target, and communications server systems. User devices 102 can take on a variety of forms, including a smartphone, tablet, laptop computer, desktop computer, video conference endpoint, and the like.

Communication network 106 may include one or more wide area networks (WANs), such as the Internet, and one or more local area networks (LANs). User devices 102 may communicate with each other, and with target server system 110 and/or communications server system 120, over communication network 106 using a variety of known or hereafter developed communication protocols. For example, the user devices 102 and target server system 110 and/or communications server system 120 may exchange Internet Protocol (IP) data packets, Realtime Transport Protocol (RTP) media packets (e.g., audio and video packets), and so on.

User devices 102 may each host a communication application used to establish/join communication sessions (e.g., online meetings, calls, conversations or chats, etc.). Authentication server system 104 includes a voice authentication module 150. According to embodiments presented herein, voice authentication module 150 of the authentication server system authenticates or verifies a user as a legitimate or authorized user based on voice signals as described below. In this case, voice signals of a user from a user device 102 may be received by voice authentication module 150 for processing (e.g., as audio signals, etc.) from target server system 110 or other destination device, and an authenticity score is produced indicating a likelihood the voice signals are from a legitimate or authorized user. In an embodiment, target server system 110 or other device or system coupled to communication network 106 may host voice authentication module 150 to authenticate voice signals of a user in substantially the same manner described below.

Figure 2:
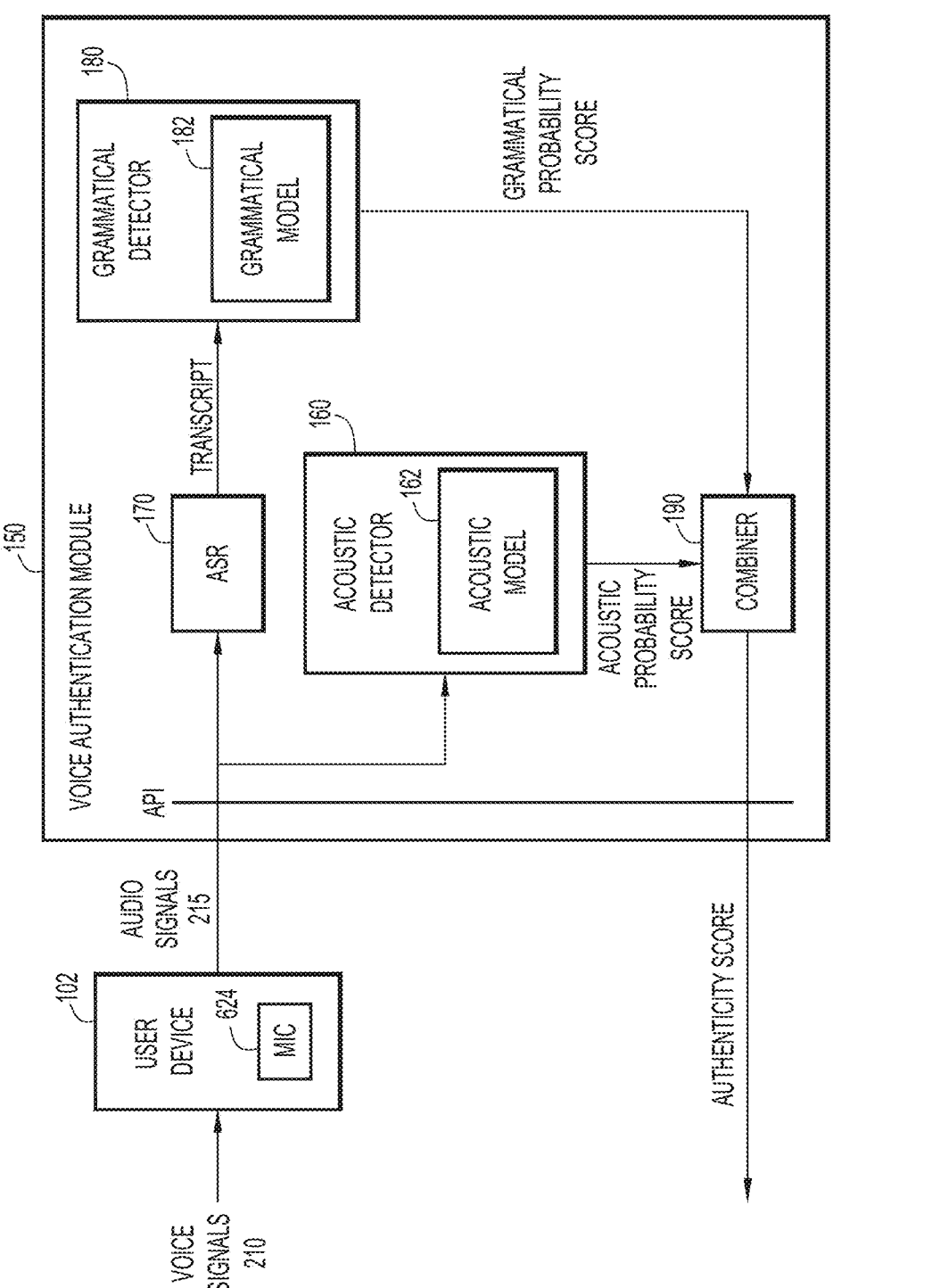
FIG. 2 illustrates a block diagram of a system configured for authenticating users based on voice signals, according to an example embodiment.

FIG. 2 illustrates voice authentication module 150 configured for authenticating a user based on voice signals according to an example embodiment. Initially, user device 102 enables a user to join or initiate a communication session. In an embodiment, user device 102 includes a microphone or other sound sensing device 624 to capture voice signals of the user and produce audio signals representing the voice signals for processing by voice authentication module 150. The voice (and audio) signals include speech, such as an utterance. The speech or utterance may include any quantity of words, sentences, clauses, sounds, and/or other units of speech.

Voice authentication module 150 includes an acoustic detector 160, an automatic speech recognition (ASR) unit 170, a grammatical (or linguistic) detector 180, and a combiner 190. Voice signals 210 from the user are captured by a microphone 624 of user device 102. The microphone produces audio signals 215 (corresponding to voice signals 210). The audio signals may be provided to voice authentication module 150 for processing (e.g., via target server system 110, communications server system 120, etc.). The audio signals include speech (e.g., an utterance, etc.) provided by the user.

Audio signals 215 are provided to acoustic detector 160. Acoustic detector 160 includes an acoustic model 162 that distinguishes individual users based on phonic or acoustic characteristics or features (or characteristics or features of the sound) of their speech or utterances. These characteristics or features may include any features pertaining to the sound of the speech signal or utterance (e.g., a fundamental frequency (e.g., an approximate frequency of a substantially periodic speech signal), an amplitude or intensity, a pitch, etc.). In general, the acoustic detector may rely on any feature-extraction procedure applicable to acoustic data (e.g., Mel-Frequency Cepstral Coefficients (MFCCs), Perceptual Linear Prediction (PLP), etc.) The acoustic model preferably includes a machine learning (ML) model that is trained based on audio speech samples (or acoustic features of audio speech samples) stored in database system 118 as described below. Once the acoustic model is trained on the data in the database system, the acoustic model receives an input including a user identifier and a corresponding audio sample (e.g., audio signals including speech or an utterance) and determines an acoustic probability value or score (e.g., a probability) indicating a likelihood that the audio sample has been provided by that user. The acoustic probability score may be normalized to any desired range of values (e.g., 0-1, 0-100, etc.). In other words, the acoustic model authenticates or verifies the user by analyzing the acoustic features of the audio sample and determining the likelihood the user providing the audio sample corresponds to the user of the user identifier. The acoustic model may be periodically (e.g., at certain time intervals, according to a schedule, etc.) or continuously updated and retrained in accordance with updates to data within the database system in order to maintain the acoustic model in synchronization with changes in user-bases and individual users speech and linguistic patterns.

Since the input for voice authentication module 150 includes audio signals 215 and grammatical detector 180 processes textual data, the voice authentication module includes pre-processing, to transcribe the audio signals into written or textual transcripts for processing by the grammatical detector. Accordingly, automatic speech recognition (ASR) unit 170 receives audio signals 215 and performs speech-to-text conversion to produce a transcript of the audio signals for grammatical detector 180. The automatic speech recognition (ASR) unit may be integrated into the grammatical detector, or may be a separate unit. Automatic speech recognition unit 170 may employ any conventional or other automated speech recognition (ASR) and/or speech-to-text techniques to transform the audio signals to text.

Grammatical detector 180 includes a grammatical (and stylistic) model 182. The grammatical model preferably includes a machine learning (ML) model, and recognizes linguistic patterns particular to each user. These patterns may pertain to use of vocabulary and set phrases, preferences in speech register, syntactic constructions, length and complexity of sentences and clauses, and/or to any linguistic or stylometric features or attributes useful to identify an individual (e.g., specific grammatical errors non-native speakers commit, regionalisms, dialectical patterns, grammatical attributes, lexical attributes, sociolectal patterns (e.g., patterns of lexical items, such as words or a vocabulary, used by a demographic or social group, etc.), etc.). In general, the grammatical detector may recognize any grammatical patterns, attributes, or features particular to a user. These grammatical patterns, attributes, or features may pertain to any language-related aspects (e.g., linguistic, stylistic, syntactical, morphology, etc.).

Grammatical detector 180 may operate in parallel with acoustic detector 160. Once grammatical model 182 is trained, the grammatical model analyzes linguistic patterns in the transcript of a given utterance and determines a grammatical probability value or score (e.g., a probability) for a user to be the provider of the given utterance. The grammatical probability score may be normalized to any desired range of values (e.g., 0-1, 0-100, etc.). The use of a grammatical detector provides greater resistance against attempts at deceptively spoofing or impersonating acoustic characteristics of a user voice. Since techniques exist to simulate a voice of an individual and transform utterances from one person to resemble utterances of another person, these techniques may be used with a malevolent intent (even with small samples of audio data) to impersonate a user. However, proper imitation of idiosyncratic stylistic and linguistic features of an individual involves a much larger amount of data which is less likely to be available to impersonators or outsiders. Accordingly, an organization can leverage a large number of utterances exchanged by its members in the course of their daily work through meetings, email, messaging programs, and the like which can be used to authenticate the members according to the example embodiments.

Combiner 190 receives the acoustic probability score from acoustic detector 160 and the grammatical probability score from grammatical detector 180. The combiner combines these scores to produce an authenticity value or score that indicates a likelihood the user is legitimate (e.g., the user corresponds to the audio signals, etc.). The combiner may combine the scores in any fashion (e.g., summation, weighted summation, average, weighted average, etc.). Weights may be based on the particular scenario in order to favor the acoustic or grammatical analysis. The authenticity score may be normalized to any desired range of values (e.g., 0-1, 0-100, etc.). In addition, the combiner may employ a machine learning (ML) model to combine the acoustic and grammatical probability scores (e.g., based on acoustic and/or grammatical features, etc.) and produce the authenticity score. The authenticity score is provided from voice authentication module 150 to target server system 110 or other destination device. When the authenticity score is below a threshold (e.g., indicating a low likelihood of a legitimate or authorized user, etc.), the target server system or other destination device may perform an appropriate action (e.g., deny access or information, provide a prompt for a new audio sample for authentication or verification, trigger an alert unbeknownst to the illegitimate user, etc.).

Voice authentication module 150 may include, or be in the form of, an application programming interface (API) that enables communication with external services. The API may be invoked and provided with audio signals of user voice and a user identifier in order to process the audio signals and produce an authenticity score indicating a likelihood the user is legitimate (e.g., the user corresponds to an authorized user of the user identifier, etc.). The API may be invoked or called by any service requiring identification of audio signals provided by users. The API may operate online (e.g., at the same time that audio signals are received, etc.) or by processing audio signals with some reasonable delay. Audio signals provided to the API are processed to extract acoustic features of the same type for which acoustic detector 160 has been trained. The audio signals are also converted into text transcripts suitable to be processed by grammatical detector 180. The acoustic and grammatical detectors determine a probability that the audio signals are authentic (e.g., correspond to an authorized user of the user identifier, etc.), and the probabilities are combined to produce an authenticity score that is returned to the calling service. When the authenticity score is lower than a threshold (e.g., indicating an illegitimate user or impersonator, etc.), an alarm may be raised to trigger an appropriate response.

The application programming interface (API) of voice authentication module 150 further serves to collect and transmit training data (e.g., audio signals and corresponding user identifiers, etc.) from organizations to database system 118. The training data may be collected from communications and/or interactions between organization members, and may be transmitted continuously since new meetings and conversations may constantly occur among those organization members. In addition, the API may also receive feedback, following the authenticity predictions, to notify the API of successful authentications (e.g., true positives and true negatives) and/or unsuccessful authentications (e.g., false positives and false negatives). The feedback data is useful to calibrate parameters and learn (or re-train the machine learning models) from prior authentications.

Figure 3:
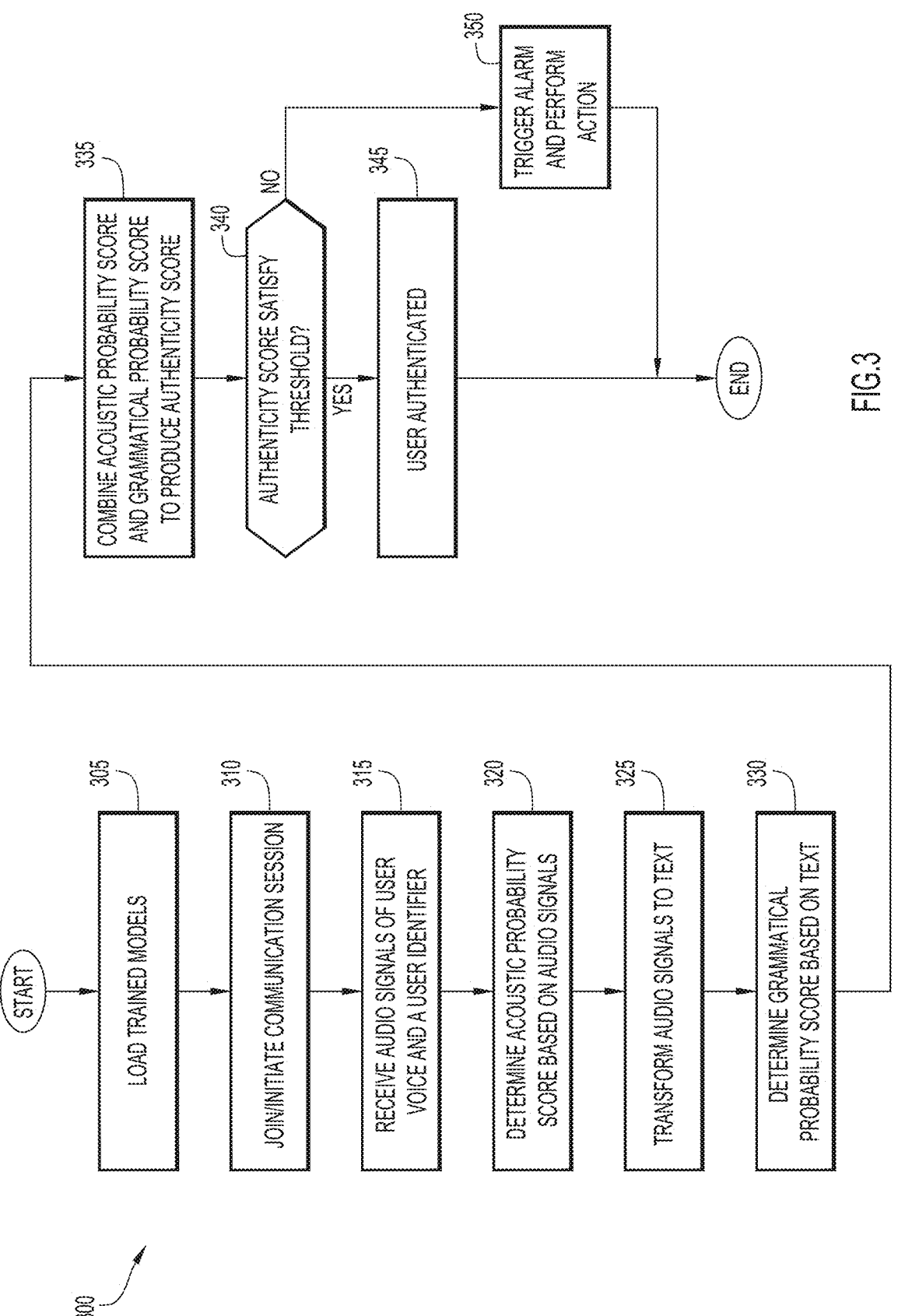
FIG. 3 is a flowchart of a method for authenticating a user based on voice signals, according to an example embodiment.

With continued reference to FIGS. 1 and 2, FIG. 3 illustrates a flowchart of an example method 300 for authenticating a user based on voice signals according to an example embodiment.

Initially, the various previously trained machine learning (ML) models of acoustic detector 160 and grammatical detector 180 are loaded at operation 305. These models may be trained as described below. The training may be accomplished by authentication server system 104 or other server system, or by another computer device. The training of the models may be performed periodically (e.g., at certain time interval, according to a schedule, etc.) by a separate process. User device 102 of a user enables the user to initiate or join a communication session (e.g., video conference, telephone conference, call, etc.) at operation 310. The communication session involves user voice and may be established with a desired target destination device (e.g., target server system 110, another user device 102, etc.) The communication session may be managed and/or conducted through communications server system 120. Microphone or other sound sensing device 624 captures voice signals of the user and produces audio signals (corresponding to the voice signals).

Voice authentication module 150 receives the audio signals and a user identifier at operation 315. The audio signals and user identifier may be provided to the voice authentication module from a desired or intermediary destination device (e.g., target server system 110, communications server system 120, etc.). The user identifier is used to identify a legitimate or authorized user for authenticating the audio signals (or user). The user identifier may be any identifier to indicate an identity of a legitimate or authorized user (e.g., username, user identification, etc.). For example, the user identifier may include, or be associated with or ascertained from, a user name, a handle, an email address, a telephone number, a user device serial number, and/or a network address of the user device. Further, the user may provide identity information (e.g., name, telephone number, email address, handle, etc.) when initiating or joining the communication session, where the identity information may be used to determine the user identifier. The audio signals and user identifier are provided to acoustic detector 160 to determine an acoustic probability score at operation 320. The acoustic detector 160 preferably includes machine learning (ML) acoustic model 162 to determine the acoustic probability score. The acoustic model receives the user identifier and the audio signals, analyzes acoustic characteristics of the audio signals, and determines the acoustic probability score (e.g., a probability) indicating a likelihood that the audio signals have been provided by the user associated with the user identifier.

Acoustic detector 160 may include any conventional or other machine learning models (e.g., mathematical/statistical, classifiers, transformer model, feed-forward, recurrent, convolutional, deep learning, or other neural networks, etc.) to determine the acoustic probability score.

In an embodiment, acoustic detector 160 may employ a neural network. For example, neural networks may include an input layer, one or more intermediate layers (e.g., including any hidden layers), and an output layer. Each layer includes one or more neurons, where the input layer neurons receive input (e.g., audio signals, feature vectors of audio signals, user identifier, etc.), and may be associated with weight values. The neurons of the intermediate and output layers are connected to one or more neurons of a preceding layer, and receive as input the output of a connected neuron of the preceding layer. Each connection is associated with a weight value, and each neuron produces an output based on a weighted combination of the inputs to that neuron. The output of a neuron may further be based on a bias value for certain types of neural networks (e.g., recurrent types of neural networks, etc.).

The weight (and bias) values may be adjusted based on various training techniques. For example, the machine learning of the neural network may be performed using a training set of user identifiers and corresponding audio signals as input and corresponding known classifications as outputs, where the neural network attempts to produce the provided output (or classification, or probability of classification) and uses an error from the output (e.g., difference between produced and known outputs) to adjust weight (and bias) values (e.g., via backpropagation or other training techniques).

In an embodiment, audio signals of persons and a corresponding user identifier may be used for the training set as input, while their known corresponding classifications (e.g., corresponding to the person, lack of correspondence to the person, etc.) may be used for the training set as known output. In an embodiment, feature vectors may be extracted from the audio signals and used with the user identifier for the training set as input, while their known corresponding classifications may be used for the training set as known output. A feature vector may include any suitable features of the audio signals (e.g., fundamental or other frequency, pitch, amplitude or intensity, etc.). However, the training set may include any desired audio signals of any persons for the different classes to learn the characteristics (e.g., correspondence, lack of correspondence, etc.) for authenticating a user based on voice signals.

The output layer of the neural network indicates a classification (e.g., correspondence, lack of correspondence, etc.) for input data. By way of example, the classes used for the classification may include a class associated with the correspondence to a user and a class associated with the lack of correspondence to the user. The output layer neurons may be associated with the different classes indicating the correspondence to a user or a lack of correspondence to the user, and indicate a probability for the input data being within a corresponding class (e.g., a probability of the input data being in a class associated with correspondence to the user, a probability of the input data being in a class associated with a lack of correspondence to a user, etc.). The probabilities may be used to determine the acoustic probability score (e.g., the probability associated with class indicating the correspondence to the user may be used as the acoustic probability score, the probabilities for each class may be combined (e.g., weighted sum or combination, etc.), etc.). The audio signals and user identifier are provided to the neural network in order to determine the acoustic probability score based on the probabilities produced by the neural network.

The audio signals are further provided to automatic speech recognition (ASR) unit 170. The automatic speech recognition (ASR) unit may be integrated into grammatical detector 180, or may be a separate unit. The automatic speech recognition (ASR) unit converts the audio signals to text to produce a transcript of the audio signals at operation 325. The transcript and user identifier are provided to grammatical detector 180 to determine a grammatical probability score at operation 330. The grammatical detector preferably includes machine learning (ML) grammatical model 182 that recognizes linguistic patterns particular to each user. These patterns may pertain to use of vocabulary and set phrases, preferences in speech register, syntactic constructions, length and complexity of sentences and clauses, and/or to any linguistic or stylometric features useful to identify an individual (e.g., specific grammatical errors non-native speakers commit, regionalisms, grammatical attributes, lexical attributes, dialectical and sociolectal patterns, etc.). The grammatical model analyzes linguistic patterns of the transcript and determines the grammatical probability score (e.g., a probability) for a user to be the provider of a given utterance.

Grammatical detector 180 may include any conventional or other machine learning models (e.g., mathematical/statistical, classifiers, transformer model, feed-forward, recurrent, convolutional, deep learning, or other neural networks, etc.) to determine the grammatical probability score.

In an embodiment, grammatical detector 180 may employ a neural network substantially similar to the neural network described above. In an embodiment, text indicating linguistic (e.g., grammatical or stylistic) patterns of persons and a corresponding user identifier may be used for the training set as input, while their known corresponding classifications (e.g., corresponding to the person, lack of correspondence to the person, etc.) may be used for the training set as known output. In an embodiment, feature vectors may be extracted from the text pertaining to the linguistic patterns and used with the corresponding user identifier for the training set as input, while their known corresponding classifications may be used for the training set as known output. A feature vector may include any suitable features of the text corresponding to linguistic (e.g., grammatical or stylistic) patterns (e.g., term count, frequency of terms, vocabulary or types of words, preferences in speech register, syntactic constructions, length and complexity of sentences and clauses, grammatical attributes, lexical attributes, etc.). However, the training set may include any desired text with any linguistic (e.g., grammatical or stylistic) patterns of any persons for the different classes to learn the characteristics (e.g., correspondence, lack of correspondence, etc.) for authenticating a user based on linguistic (e.g., grammatical or stylistic) features of voice signals.

The output layer of the neural network indicates a classification (e.g., correspondence, lack of correspondence, etc.) for input data. By way of example, the classes used for the classification may include a class associated with the correspondence to a user and a class associated with the lack of correspondence to the user. The output layer neurons may be associated with the different classes indicating the correspondence to a user or a lack of correspondence to the user, and indicate a probability for the input data being within a corresponding class (e.g., a probability of the input data being in a class associated with correspondence to the user, a probability of the input data being in a class associated with a lack of correspondence to a user, etc.). The probabilities may be used to determine the grammatical probability score (e.g., the probability associated with class indicating the correspondence to the user may be used as the grammatical probability score, the probabilities for each class may be combined (e.g., weighted sum or combination, etc.), etc.). The transcript and user identifier are provided to the neural network in order to determine the grammatical probability score based on the probabilities produced by the neural network.

Combiner 190 receives the acoustic probability score from acoustic detector 160 and the grammatical probability score from grammatical detector 180. The combiner combines these scores to produce an authenticity score at operation 335. The authenticity score indicates a likelihood the user is legitimate or authorized (e.g., the user corresponds to the audio signals, etc.). The combiner may combine the score in any fashion (e.g., summation, weighted summation, average, weighted average, etc.).

In addition, combiner 190 of an embodiment may employ a machine learning model to combine the acoustic probability score from acoustic model 162 and the grammatical probability score from grammatical model 182 to generate the authenticity score. The machine learning model may be implemented by any conventional or other machine learning models (e.g., mathematical/statistical, classifiers, feed-forward, recurrent, convolutional, deep learning, or other neural networks, etc.). In an embodiment, the machine learning model may be implemented by a neural network substantially similar to any of the neural networks described above (e.g., for acoustic model 162, grammatical model 182, etc.). The machine learning model may use a training set of acoustic and grammatical probability scores (e.g., and/or acoustic and/or grammatical features) as input and known probabilities as output, where the neural network attempts to produce the provided output.

The output layer of the neural network produces the authenticity score. The acoustic and grammatical probability scores are provided to the neural network of combiner 190 to determine the authenticity score.

The authenticity score may be provided from voice authentication module 150 to target server system 110 or other destination device. When the authenticity score does not satisfy a threshold (e.g., less than a threshold indicating a low likelihood of a legitimate or authorized user, etc.) as determined at operation 340, an alarm or notification may be provided to the destination device at operation 350, and an appropriate action may be performed by the destination and/or intermediary device (e.g., authentication server system 104, target server system 110, communications server system 120, etc.) in response to the alarm or notification (e.g., deny access or information, provide a prompt for a new audio sample for authentication or verification of a user, etc.).

When the authenticity score satisfies a threshold (e.g., at or above a threshold indicating a high likelihood of a legitimate user, etc.) as determined at operation 340, the user is considered genuine or authenticated (e.g., the audio signals correspond to audio signals of the legitimate or authorized user, etc.) at operation 345. A notification may be provided to the destination device and an appropriate action may be performed by the destination device and/or intermediary device (e.g., authentication server system 104, target server system 110, communications server system 120, etc.) in response to the notification (e.g., enable access or information, etc.).

In an embodiment, authenticity of the user may further be based on a speed of talking and pauses in speech in order to improve accuracy for short conversations. In this case, the speed of talking and pauses in speech may be features extracted from the audio signals and used by acoustic model 162 and/or grammatical model 182 to determine the acoustic and grammatical probability scores which are used to produce the authenticity score. Further, the speed of talking and pauses in speech may be additional features that are compared to features of a corresponding known user (e.g., extracted from audio speech samples of the known user) and used to determine authenticity. For example, comparison results (e.g., indicating a correspondence or lack of correspondence of these features to the known user) may be used to determine or modify the authenticity score (e.g., combined with the acoustic probability score and/or grammatical probability score in any fashion (e.g., sum or weighted sum, average or weighted average, etc.). Further, the comparison results may be used as criteria (e.g. in addition to the authenticity score, etc.) for authenticating a user (e.g., the speed of talking and pauses in speech need to correspond to those of the known user, etc.).

Figure 4:
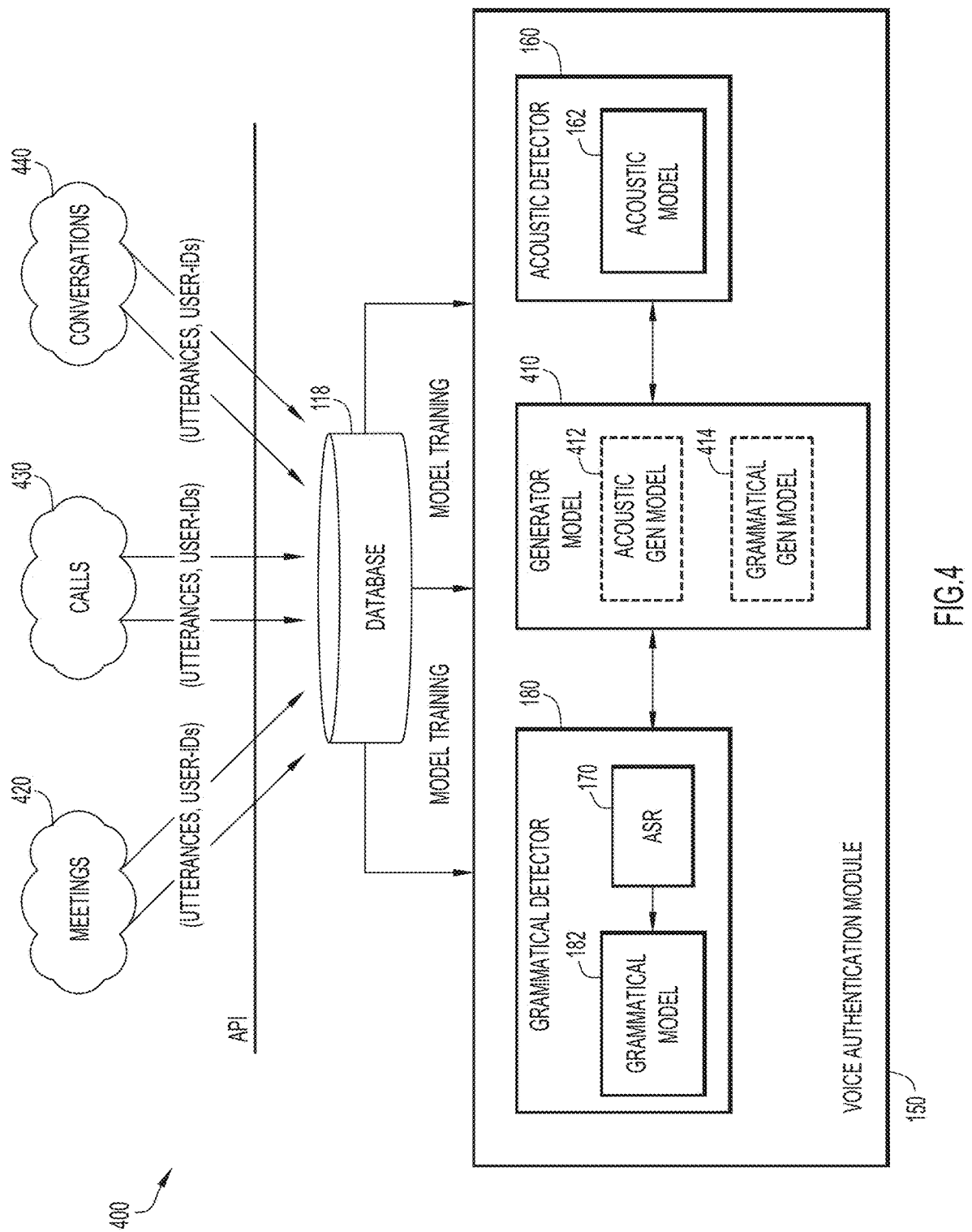
FIG. 4 is a flow diagram of a method for training machine learning models for authenticating a user based on voice signals, according to an example embodiment.

FIG. 4 illustrates a method 400 of training acoustic machine learning (ML) model 162 of acoustic detector 160 and grammatical machine learning (ML) model 182 of grammatical detector 180, according to an example embodiment. Initially, voice authentication module 150 includes acoustic detector 160, automatic speech recognition (ASR) unit 170, and grammatical detector 180, each as described above. The automatic speech recognition (ASR) unit may be integrated into grammatical detector 180, or may be a separate unit as described above. The acoustic detector preferably includes machine learning (ML) acoustic model 162 to process audio signals (or features thereof) and determine the acoustic probability score indicating a likelihood a user providing an utterance corresponds to a legitimate or authorized user as described above. The grammatical detector preferably includes machine learning (ML) grammatical model 182 to process a textual transcript of the audio signals (or features of the transcript) and determine the grammatical probability score indicating a likelihood the user providing the utterance corresponds to the legitimate or authorized user as described above. Voice authentication module 150 may further include a generator model 410 that is used to generate training data for training the acoustic and grammatical models as described below.

Database system 118 stores audio samples (or audio signals) of voice from known users that are collected during communication sessions. For example, the communication sessions may be managed and/or conducted by communications server system 120 and include meetings 420 (e.g., online or other video conferences, etc.), calls 430, conversations or chats 440, or any other type of communication session employing user voice and/or text. The audio samples may include, or be derived from, audio recordings of the communication sessions, and are used to train acoustic model 162 and grammatical model 182. In the event that storing recordings may be challenging due to privacy regulations, features may be extracted from the audio of the communication sessions and stored in the database system. These features may include any feature for use as an element of a feature vector for training the acoustic model. Database system 118 may also store audio samples from voices of external, unrelated, and/or unknown individuals in the same format as the audio samples from the recordings to serve in the training of the acoustic and grammatical models by providing contrastive data. The training data is preferably stored as pairs of user identifier (e.g., identified or retrieved from information of the communication sessions) and audio sample (or features) in order to associate each user with their audio sample.

Database system 118 may also store text data (along with user identifiers) from written conversations or communication sessions. This data represents an additional textual corpus that may supplement the transcripts from automatic speech recognition (ASR) unit 170 for training grammatical model 182. For example, text exchanges from online messaging platforms may be valuable since many users tend to use the platforms with a linguistic register closer to spoken language and often quite remote from the normative standard of their written language. In the event that storing the text data may be challenging due to privacy regulations, features may be extracted from the text data and stored in the database. These features may include any feature for use as an element of a feature vector for training the grammatical model.

The content of database system 118 is periodically (e.g., at a certain time interval, according to a schedule, etc.) or continuously updated as new communication sessions (e.g., meetings, communications, etc.) occur between users. Recognizable imprints from each user expression patterns are stored until enough time has elapsed and the patterns are deemed obsolete.

In an embodiment, acoustic model 162 and grammatical model 182 may be trained utilizing adversarial techniques, such as those within the framework of generative adversarial networks (GAN). Generally, generative adversarial networks (GAN) include a data generator machine learning (ML) model and a data discriminator machine learning (ML) model. The data generator model generates training data for evaluation (or classification) by the data discriminator model. The data generator model attempts to increase an error rate of the data discriminator model. In other words, the data generator model attempts to generate training data that produces errors in the evaluation (or classification) performed by the data discriminator model (e.g., produce an incorrect classification, etc.). The data discriminator model is initially trained with a known training data set to classify data until reaching a sufficient accuracy, and updates (or retrains) according to classification results (e.g., an incorrect classification produced for training data of the data generator model, etc.). The data generator model is trained based on the (correct or incorrect) results produced by the data discriminator model. Independent training procedures are performed for the data generator and data discriminator models to enable the data generator model to produce improved data, while the data discriminator model improves classification results. The data generator model and data discriminator models may be implemented by various types of neural networks (e.g., feed-forward, recurrent, convolutional, deep learning, and/or other neural networks, etc.). The neural networks may be substantially similar to, and trained in substantially the same manner as, the neural network described above (e.g., for acoustic model 162, grammatical model 182, combiner 190, etc.).

For example, generator model 410 of voice authentication module 150 may generate pairs of audio samples and user identifiers different from, but similar to, the pairs of training data collected from communication sessions and stored in database system 118. Generator model 410 serves as the generator model of a generative adversarial network (GAN) framework. Acoustic model 162 and grammatical model 182 serve as data discriminator models in the GAN framework, and are trained to distinguish between real or actual user utterances and the outputs of generator model 410.

The audio samples of the training data produced by generator model 410 are in audio format, and are used in that format by acoustic model 162. With respect to grammatical model 182, the audio samples are converted into text by automatic speech recognition (ASR) unit 170. During training, generator model 410 becomes progressively more effective at generating utterances indistinguishable from genuine ones based on feedback from the acoustic and grammatical models, while the acoustic and grammatical models learn to overcome generator model 410 by identifying utterances that genuinely originate from a corresponding alleged user.

Once acoustic model 162 and grammatical model 182 have reached a sufficient level of discriminatory power (e.g. or accuracy based on differences between current and known outputs), these models are provided for use in acoustic detector 160 and grammatical detector 180.

In an embodiment, generator model 410 of the generative adversarial network (GAN) framework includes an acoustic generator model 412 and a grammatical generator model 414. The grammatical generator model generates realistic written text based on the texts stored in database system 118, while the acoustic generator model converts the resulting text to samples or messages in an audio format. The output of the acoustic generator model and a corresponding user identifier serve as the output of generator model 410. During training, grammatical generator model 414 becomes progressively more effective at generating written text indistinguishable from genuine ones based on feedback from grammatical model 182. Similarly, acoustic generator model 412 becomes progressively more effective at generating utterances indistinguishable from genuine ones based on feedback from the acoustic model. The acoustic and grammatical models learn to overcome generator models 412, 414 by identifying utterances that genuinely originate from a corresponding alleged user. The acoustic and grammatical generator models operate in different domains (acoustic and grammatical), and are thus trained on different aspects of production of false utterances, thereby making them more powerful by specialization. The acoustic generator and grammatical generator models may be implemented by various types of neural networks (e.g., feed-forward, recurrent, convolutional, deep learning, and/or other neural networks, etc.). The neural networks may be substantially similar to, and trained in substantially the same manner as, the neural network described above (e.g., for acoustic model 162, grammatical model 182, combiner 190, generator model 410, etc.).

Since natural-sounding utterances may be hard to originate, an embodiment may enable generator model 410 of the generative adversarial network (GAN) framework to re-use genuine utterances produced by real individuals (and stored in database system 118). In this case, generator model 410 adapts or varies the acoustic and grammatical characteristics of the genuine utterances to spoof or resemble the acoustic and grammatical characteristics of another individual. In other words, the genuine utterances are varied to resemble utterances of an impersonator. The utterances may be varied in any fashion (e.g., any characteristics may be varied, characteristics may be varied in a random or incremental fashion, characteristics may be varied to within a tolerance of corresponding characteristics of an impersonator, etc.).

During training, generator model 410 may vary the utterances based on feedback from acoustic model 162 and/or grammatical model 182, while the acoustic and grammatical models learn to overcome generator model 410 by identifying utterances that genuinely originate from a corresponding alleged user. In other words, the acoustic and grammatical models may learn to recognize attempts at automated voice-cloning or human impersonation.

In an embodiment, a generative adversarial network (GAN) technique for artistic (computer vision) style transfer may be adapted and employed to train grammatical model 182. Style transfer (with respect to computer vision) generally refers to generating an image based on content of a first image and a style of one or more second images. In other words, the image is generated from the first image in the style of the second images. The generative adversarial network (GAN) may include an encoding network, a transfer network, and a discriminative network. The encoding network analyzes images to extract style features and encode a style of the images. The encoded style is used by the transfer network to generate a candidate image according to the style. The discriminative network classifies the generated image with respect to the style and uses a sample of the second images. The result is used to update (or retrain) the encoding and/or transfer networks to produce an improved image.

In this case, training of grammatical model 182 may be perceived as a style transfer in which a style of a user corresponds to the user linguistic traits or patterns. A style collection corresponds to a collection of transcripts of a given user which may be used by a linguistic encoding network of generator model 410 to extract features of the linguistic traits from the collection of transcripts. Grammatical model 182 may include a linguistic transfer network to generate text according to the linguistic traits and a linguistic discriminative network to classify the text as containing the style (or linguistic traits) of the user. The linguistic discriminative network uses transcripts from the collection for the classification. The result of the linguistic discriminative network is used to update (or retrain) the linguistic encoding and/or linguistic transfer networks to produce an improved text. During training, the linguistic encoding and linguistic transfer networks become progressively more effective at generating written text having the style or linguistic traits of the user based on feedback from the linguistic discriminative network, while the linguistic discriminative network learns to identify text that genuinely originates from a corresponding alleged user. Once trained, the linguistic discriminative network may be employed by grammatical model 182 to distinguish texts corresponding to an impersonator from genuine texts from an alleged user.

The linguistic encoding network, linguistic transfer network, and linguistic discriminative network may be implemented by various types of neural networks (e.g., feed-forward, recurrent, convolutional, deep learning, and/or other neural networks, etc.). The neural networks may be substantially similar to, and trained in substantially the same manner as, the neural network described above (e.g., for acoustic model 162, grammatical model 182, combiner 190, generator model 410, etc.).

FIG. 5 is a flowchart of an example method 500 for authenticating a user based on voice signals according to an example embodiment. At operation 505, acoustic characteristics of a user voice are analyzed by a first machine learning model of a processor. At operation 510, linguistic patterns in the user voice are analyzed by a second machine learning model of the processor. At operation 515, the user is authenticated with respect to an authorized user by the processor based on analysis of the acoustic characteristics and the linguistic patterns of the user voice by the first and second machine learning models.

Figure 6:
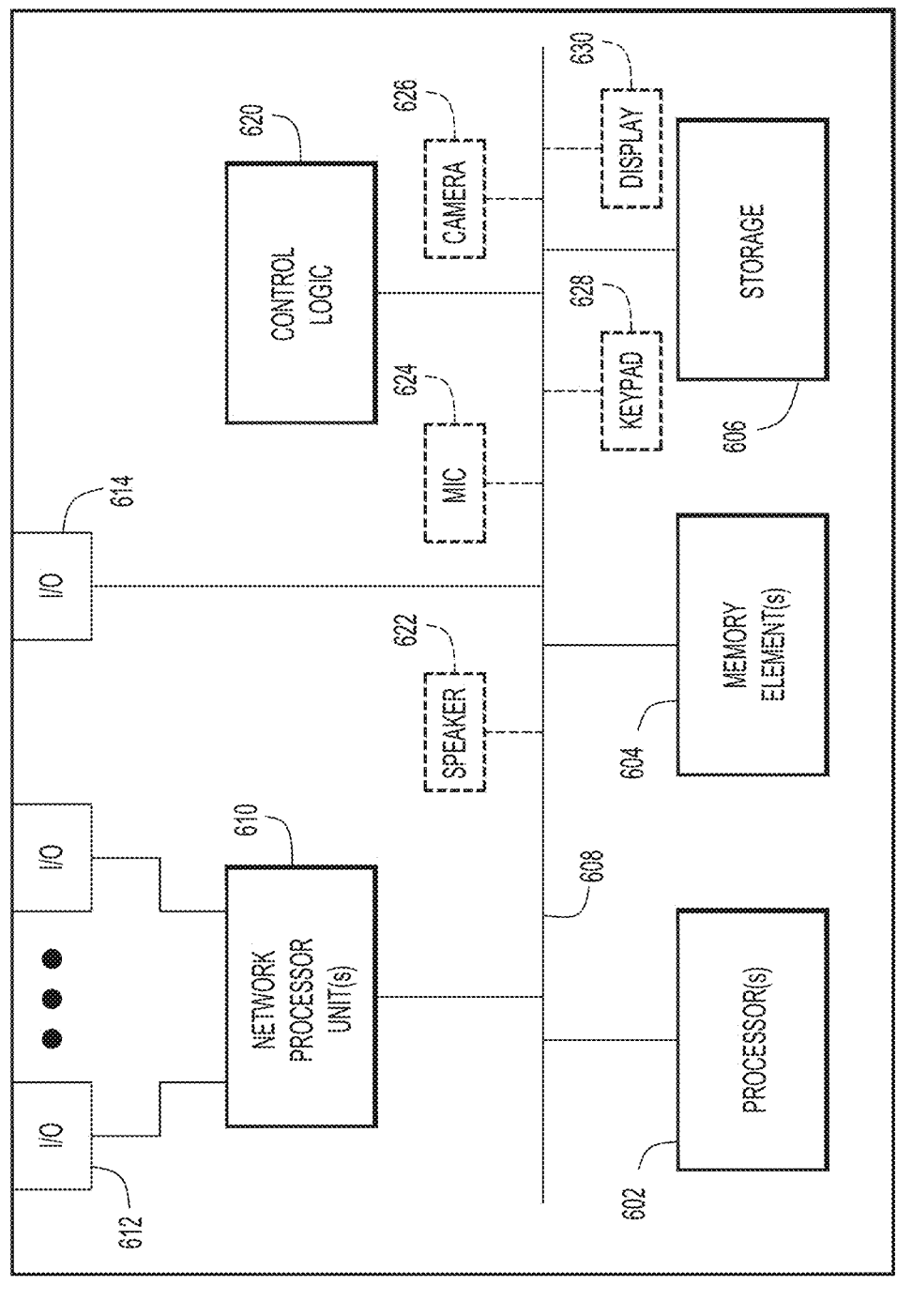
FIG. 6 illustrates a hardware block diagram of a computing device configured to perform functions associated with authenticating users based on voice signals as discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device or apparatus, such as computing device 600 or any combination of computing devices 600, may be configured as any device entity/entities (e.g., computer devices, authentication, target or other server systems, endpoint devices, user devices, etc.) as discussed for the techniques depicted in connection with FIGS. 1-5 in order to perform operations of the various techniques discussed herein.

In at least one embodiment, computing device 600 may be any apparatus that may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, any other I/O port(s), and/or antenna(s)/antenna array(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

With respect to certain entities (e.g., computer device, endpoint device, user device, etc.), computing device 600 may further include, or be coupled to, an audio speaker 622 to convey sound, microphone or other sound sensing device 624, camera or image capture device 626, a keypad or keyboard 628 to enter information (e.g., alphanumeric information, etc.), and/or a touch screen or other display 630. These items may be coupled to bus 608 or I/O interface(s) 614 to transfer data with other elements of computing device 600.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

Present embodiments may provide various technical and other advantages. In an embodiment, training data can be efficiently produced that simulates impersonators (or other individuals) to improve accuracy and training of machine learning models. Use of adversarial and/or style transfer networks further improves accuracy and training of the machine learning models by providing data close to actual data to enable differentiation. In addition, the machine learning models may be continuously updated (or retrained) based on feedback from authentication results and/or training data continuously or constantly received from new communication sessions. For example, a classification may initially be indicated with a probability. Feedback pertaining to the classification (e.g., correct or incorrect) may be received. The feedback may be used to update or train the machine learning models to adjust the probability for the classification (e.g., update or train the machine learning models to increase or decrease the probability based on the feedback respectively indicating a correct or incorrect classification, etc.).

The programs and software described herein may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other stores or repositories, queue, etc.). The data transmitted between device entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., graphical user interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, datacenters, etc.). The computer or other processing systems employed by the present embodiments may be implemented by any number of any personal or other type of computer or processing system (e.g., desktop, laptop, Personal Digital Assistant (PDA), mobile devices, etc.), and may include any commercially available operating system and any combination of commercially available and custom software. These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flowcharts and diagrams illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), Intranet, Internet, hardwire, modem connection, wireless, etc.). For example, the functions of the present embodiments may be distributed in any manner among the various end-user/client, server, and other processing devices or systems, and/or any other intermediary processing devices. The software and/or algorithms described above and illustrated in the flowcharts and diagrams may be modified in any manner that accomplishes the functions described herein. In addition, the functions in the flowcharts, diagrams, or description may be performed in any order that accomplishes a desired operation.

The networks of present embodiments may be implemented by any number of any type of communications network (e.g., LAN, WAN, Internet, Intranet, Virtual Private Network (VPN), etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system.

Any combination of interfaces can be provided for elements described herein in order to facilitate operations as discussed for various embodiments described herein.

In various embodiments, any device entity or apparatus as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more device entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, any device entity or apparatus for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four device entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more device entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combinations of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

In one form, a method is provided. The method comprises: analyzing acoustic characteristics of a user voice by a first machine learning model of a processor; analyzing linguistic patterns in the user voice by a second machine learning model of the processor; and authenticating the user with respect to an authorized user by the processor based on analysis of the acoustic characteristics and the linguistic patterns of the user voice by the first and second machine learning models.

In one example, the linguistic patterns include one or more from a group of use of vocabulary and phrases, preferences in speech register, syntactic constructions, length and complexity of sentences and clauses, and linguistic attributes.

In one example, the first machine learning model processes audio signals of the user voice and generates a first value indicating correspondence of the acoustic characteristics of the user voice with the authorized user, wherein the second machine learning model processes text produced from the audio signals of the user voice and generates a second value indicating correspondence of the linguistic patterns of the text with the authorized user, and wherein authenticating the user further comprises combining the first value and the second value to produce a third value indicating authenticity of the user with respect to the authorized user.

In one example, the method further comprises training the first and second machine learning models by the processor using voice samples of authorized users and voice samples of unauthorized users.

In one example, the method further comprises training the first and second machine learning models by the processor using an adversarial network including a generator model that generates voice samples varying from voice samples of authorized users.

In one example, the generator model includes a grammatical generator model to generate textual data and an acoustic generator model to generate audio samples from the textual data, and wherein the audio samples are provided by the generator model for training the first and second machine learning models.

In one example, the generator model adapts the acoustic characteristics and the linguistic patterns of a voice sample of an authorized user to resemble the acoustic characteristics and the linguistic patterns of another individual.

In another form, an apparatus is provided. The apparatus comprises: a computing system comprising one or more processors, wherein the one or more processors are configured to: analyze acoustic characteristics of a user voice by a first machine learning model; analyze linguistic patterns in the user voice by a second machine learning model; and authenticate the user with respect to an authorized user based on analysis of the acoustic characteristics and the linguistic patterns of the user voice by the first and second machine learning models.

In another form, one or more non-transitory computer readable storage media are provided. The non-transitory computer readable storage media are encoded with processing instructions that, when executed by one or more processors, cause the one or more processors to: analyze acoustic characteristics of a user voice by a first machine learning model; analyze linguistic patterns in the user voice by a second machine learning model; and authenticate the user with respect to an authorized user based on analysis of the acoustic characteristics and the linguistic patterns of the user voice by the first and second machine learning models.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
analyzing acoustic characteristics of a user voice of a user by a first machine learning model of a processor, wherein the first machine learning model generates a first value indicating correspondence of the acoustic characteristics of the user voice with an authorized user;
analyzing linguistic patterns in the user voice by a second machine learning model of the processor, wherein the linguistic patterns include words specific to particular geographic regions and vocabulary used by social groups, and the second machine learning model generates a second value indicating correspondence of the linguistic patterns in the user voice with the authorized user;
combining the first value and the second value by the processor to produce an authenticity value indicating authenticity of the user with respect to the authorized user;
determining correspondence by the processor between speed of talking and pauses in the user voice and speed of talking and pauses in speech of the authorized user; and
authenticating the user with respect to the authorized user by the processor based on the authenticity value satisfying a threshold and the speed of talking and pauses in the user voice corresponding to the speech of the authorized user.

2. The method of claim 1, wherein the linguistic patterns further include one or more from a group of use of vocabulary and phrases, preferences in speech register, syntactic constructions, length and complexity of sentences and clauses, and linguistic attributes.

3. The method of claim 1, wherein the first machine learning model processes audio signals of the user voice, and wherein the second machine learning model processes text produced from the audio signals of the user voice and generates the second value indicating correspondence of the linguistic patterns of the text with the authorized user.

4. The method of claim 1, further comprising:
training the first and second machine learning models by the processor using voice samples of authorized users and voice samples of unauthorized users.

5. The method of claim 1, further comprising:
training the first and second machine learning models by the processor using an adversarial network including a generator model that generates voice samples varying from voice samples of authorized users.

6. The method of claim 5, wherein the generator model includes a grammatical generator model to generate textual data and an acoustic generator model to generate audio samples from the textual data, and wherein the audio samples are provided by the generator model for training the first and second machine learning models.

7. The method of claim 5, wherein the generator model adapts the acoustic characteristics and the linguistic patterns of a voice sample of an authorized user to resemble the acoustic characteristics and the linguistic patterns of another individual.

8. An apparatus comprising:
a computing system comprising one or more processors, wherein the one or more processors are configured to perform operations including:
analyzing acoustic characteristics of a user voice of a user by a first machine learning model, wherein the first machine learning model generates a first value indicating correspondence of the acoustic characteristics of the user voice with an authorized user;
analyzing linguistic patterns in the user voice by a second machine learning model, wherein the linguistic patterns include words specific to particular geographic regions and vocabulary used by social groups, and the second machine learning model generates a second value indicating correspondence of the linguistic patterns in the user voice with the authorized user;
combining the first value and the second value to produce an authenticity value indicating authenticity of the user with respect to the authorized user;
determining correspondence between speed of talking and pauses in the user voice and speed of talking and pauses in speech of the authorized user; and
authenticating the user with respect to the authorized user based on the authenticity value satisfying a threshold and the speed of talking and pauses in the user voice corresponding to the speech of the authorized user.

9. The apparatus of claim 8, wherein the linguistic patterns further include one or more from a group of use of vocabulary and phrases, preferences in speech register, syntactic constructions, length and complexity of sentences and clauses, and linguistic attributes.

10. The apparatus of claim 8, wherein the first machine learning model processes audio signals of the user voice, and wherein the second machine learning model processes text produced from the audio signals of the user voice and generates the second value indicating correspondence of the linguistic patterns of the text with the authorized user.

11. The apparatus of claim 8, wherein the one or more processors are further configured to perform operations including:
training the first and second machine learning models using an adversarial network including a generator model that generates voice samples varying from voice samples of authorized users.

12. The apparatus of claim 11, wherein the generator model includes a grammatical generator model to generate textual data and an acoustic generator model to generate audio samples from the textual data, and wherein the audio samples are provided by the generator model for training the first and second machine learning models.

13. The apparatus of claim 11, wherein the generator model adapts the acoustic characteristics and the linguistic patterns of a voice sample of an authorized user to resemble the acoustic characteristics and the linguistic patterns of another individual.

14. One or more non-transitory computer readable storage media encoded with processing instructions that, when executed by one or more processors, cause the one or more processors to perform operations including:

analyzing acoustic characteristics of a user voice of a user by a first machine learning model, wherein the first machine learning model generates a first value indicating correspondence of the acoustic characteristics of the user voice with an authorized user;

analyzing linguistic patterns in the user voice by a second machine learning model, wherein the linguistic patterns include words specific to particular geographic regions and vocabulary used by social groups, and the second machine learning model generates a second value indicating correspondence of the linguistic patterns in the user voice with the authorized user;

combining the first value and the second value to produce an authenticity value indicating authenticity of the user with respect to the authorized user;

determining correspondence between speed of talking and pauses in the user voice and speed of talking and pauses in speech of the authorized user; and authenticating the user with respect to the authorized user based on the authenticity value satisfying a threshold and the speed of talking and pauses in the user voice corresponding to the speech of the authorized user.

15. The one or more non-transitory computer readable storage media of claim 14, wherein the linguistic patterns further include one or more from a group of use of vocabulary and phrases, preferences in speech register, syntactic constructions, length and complexity of sentences and clauses, and linguistic attributes.

16. The one or more non-transitory computer readable storage media of claim 14, wherein the first machine learning model processes audio signals of the user voice, and wherein the second machine learning model processes text produced from the audio signals of the user voice and generates the second value indicating correspondence of the linguistic patterns of the text with the authorized user.

17. The one or more non-transitory computer readable storage media of claim 14, wherein the processing instructions further cause the one or more processors to perform operations including:

training the first and second machine learning models using voice samples of authorized users and voice samples of unauthorized users.

18. The one or more non-transitory computer readable storage media of claim 14, wherein the processing instructions further cause the one or more processors to perform operations including:

training the first and second machine learning models using an adversarial network including a generator model that generates voice samples varying from voice samples of authorized users.

19. The one or more non-transitory computer readable storage media of claim 18, wherein the generator model includes a grammatical generator model to generate textual data and an acoustic generator model to generate audio samples from the textual data, and wherein the audio samples are provided by the generator model for training the first and second machine learning models.

20. The one or more non-transitory computer readable storage media of claim 18, wherein the generator model adapts the acoustic characteristics and the linguistic patterns of a voice sample of an authorized user to resemble the acoustic characteristics and the linguistic patterns of another individual.

\* \* \* \* \*